(12) United States Patent
Wu

(10) Patent No.: US 7,260,744 B2
(45) Date of Patent: Aug. 21, 2007

(54) COMPUTER SYSTEM DIAGNOSIS WITH USER-DEVELOPED PROCEDURE

(75) Inventor: Yuh-Cherng Wu, San Jose, CA (US)

(73) Assignee: SAP Aktiengesellschaft, Walldorf (DE)

( * ) Notice: Subject to any disclaimer, the term of this patent is extended or adjusted under 35 U.S.C. 154(b) by 538 days.

(21) Appl. No.: 10/815,059

(22) Filed: Mar. 31, 2004

(65) Prior Publication Data

US 2005/0097397 A1 May 5, 2005

Related U.S. Application Data

(60) Provisional application No. 60/513,251, filed on Oct. 21, 2003.

(51) Int. Cl.
*G06F 11/00* (2006.01)
(52) U.S. Cl. .......................... 714/26; 714/50
(58) Field of Classification Search ................ 714/46, 714/50, 20, 26
See application file for complete search history.

(56) References Cited

U.S. PATENT DOCUMENTS

| | | | |
|---|---|---|---|
| 4,654,852 A | 3/1987 | Bentley et al. | |
| 5,111,383 A | 5/1992 | Kimura et al. | |
| 5,414,836 A | 5/1995 | Baer et al. | |
| 5,440,723 A | 8/1995 | Arnold et al. | ............... 395/181 |
| 5,587,930 A | 12/1996 | Hori et al. | |
| 5,590,036 A | 12/1996 | Maeda | |
| 5,592,614 A | 1/1997 | Peters | |
| 5,708,774 A | 1/1998 | Boden | |
| 5,745,675 A | 4/1998 | Herbig et al. | |
| 5,748,880 A | 5/1998 | Ito et al. | |
| 5,754,755 A | 5/1998 | Smith, Jr. | |
| 5,877,961 A | 3/1999 | Moore | |
| 5,917,898 A | 6/1999 | Bassa et al. | |
| 5,944,839 A | 8/1999 | Isenberg | |
| 5,995,916 A | 11/1999 | Nixon et al. | |
| 6,002,868 A | 12/1999 | Jenkins et al. | |
| 6,029,004 A * | 2/2000 | Bortnikov et al. | .......... 717/158 |
| 6,078,189 A | 6/2000 | Noel | |

(Continued)

FOREIGN PATENT DOCUMENTS

EP 1109101 6/2001

(Continued)

OTHER PUBLICATIONS

Microsoft Press Computer Dictionary Third Edition, "error rate", Microsoft Press, 1997, p. 180.

(Continued)

*Primary Examiner*—Gabriel Chu
*Assistant Examiner*—Paul Contino
(74) *Attorney, Agent, or Firm*—Fish & Richardson P.C.

(57) ABSTRACT

A method of performing diagnosis comprises receiving in a computer system executable program instructions that, when executed, cause the computer system to perform a first user-developed automated diagnostic procedure that either fails or passes depending on at least one condition in the computer system. The computer system has stored therein a program 1) that, when executed, performs a plurality of preconfigured automated diagnostic procedures and 2) that is configured to accept user-developed automated diagnostic procedures. The program is executed in the computer system and in so doing the plurality of preconfigured automated diagnostic procedures and the first user-developed automated diagnostic procedure are performed.

21 Claims, 13 Drawing Sheets

U.S. PATENT DOCUMENTS

| | | | |
|---|---|---|---|
| 6,134,644 A * | 10/2000 | Mayuzumi et al. | 712/1 |
| 6,173,440 B1 * | 1/2001 | Darty | 717/130 |
| 6,195,763 B1 | 2/2001 | Mayer et al. | |
| 6,233,701 B1 | 5/2001 | Onoue | |
| 6,381,739 B1 * | 4/2002 | Breternitz et al. | 714/37 |
| 6,385,741 B1 * | 5/2002 | Nakamura | 714/38 |
| 6,477,531 B1 | 11/2002 | Sullivan et al. | |
| 6,539,499 B1 | 3/2003 | Stedman et al. | |
| 6,557,115 B2 | 4/2003 | Gillenwater et al. | |
| 6,560,721 B1 | 5/2003 | Boardman et al. | |
| 6,678,639 B2 | 1/2004 | Little et al. | |
| 6,757,634 B2 | 6/2004 | Lara | |
| 6,834,363 B2 * | 12/2004 | Austen et al. | 714/44 |
| 6,888,542 B1 | 5/2005 | Clauss | |
| 6,990,602 B1 | 1/2006 | Skinner et al. | |
| 2002/0083156 A1 | 6/2002 | Wysoczynski | |
| 2002/0116666 A1 | 8/2002 | Perez et al. | |
| 2002/0122050 A1 | 9/2002 | Sandberg | |
| 2003/0070114 A1 | 4/2003 | Yasuda | |
| 2003/0131290 A1 * | 7/2003 | Weinberg et al. | 714/46 |
| 2004/0078692 A1 * | 4/2004 | Jackson et al. | 714/38 |

FOREIGN PATENT DOCUMENTS

| | | |
|---|---|---|
| WO | WO97 15009 A1 * | 4/1997 |
| WO | WO 0118652 A1 * | 3/2001 |
| WO | 02/041105 | 5/2002 |

OTHER PUBLICATIONS

IBM Technical Disclosure Bulletin, Priority Based System Test Method, Sep. 2001, IBM Corporation, Issue 449, p. 1566.

* cited by examiner

COMPUTER SYSTEM DIAGNOSIS WITH USER-DEVELOPED PROCEDURE

CROSS-REFERENCE TO RELATED APPLICATION

This application claims benefit of U.S. Provisional Application No. 60/513,251, filed Oct. 21, 2003, and entitled "Framework fr Intelligent Diagnosis tool", which is hereby incorporated by reference in its entirety.

TECHNICAL FIELD

This description relates to performing diagnosis in a computer system.

BACKGROUND

Some computer systems used by today's business organizations are rather complex. Such a system may include of a great number of separate components that, to some extent, must operate well with each other for the system as a whole to be functional. For example, a system may include one or more sophisticated software applications for performing business operations, such as in a customer relationship management (CRM) framework. Moreover, the system may include one or more services, which are software applications devoted to managing several business application programs, and which may be considered the basic building blocks for such business applications. In addition, many systems include one or more databases with an associated component, such as a search engine, for retrieving information from the data base. Moreover, a system may include various other components dedicated to specific tasks, such as maintaining network connections, managing user accounts, and producing graphical user interfaces.

Typically, any of these exemplary components interacts with one or more of the other components during operation of the system. Each component may have alternative configurations, settings, and so on, that control how it operates in the system environment. It is therefore very important that integration between the various components is done properly. Also, some components can interact only with a specific version of certain software. Some or all of these configurations or settings may have default values when the system is first initiated. However, default settings may be, or become, inadequate. For example, a component that is preconfigured to work in a certain system environment may not function properly if the actual system includes components that were not taken into consideration in creating the default configuration. The need for special configuration or resetting of default values may be greater when a system includes components from several different manufacturers. A poorly-configured system may malfunction or not function as well as intended. The type of problems that occur can conceptually be categorized as either application related problems or content related problems.

An application related problem generally means that one or more application program does not work as intended. For example, a command or a performed operation does not produce any result at all or produces a result that is different from what it should be. As another example, something that should happen automatically in the system does not happen or occurs at the wrong time.

A content related problem generally means that, while the system behavior may appear normal, the results are not reliable. For example, the results of a search performed on a database with known contents are not what they should be. As another example, data corruption may occur in the transfer of information between components in a system.

These problems also can occur after a user customizes the system. For example, adding one or more user created components to a preconfigured system may cause problems if the original components are not properly configured to work with the custom component, or by the custom component is not properly configured for the original components, or both.

Moreover, it may be difficult to discern the exact cause of a particular problem that is observed. For example, when the system presents a collection of data that is retrieved from several different locations and it is discovered that the data is not complete, the user may not be able to readily determine whether this problem is due to a failure to retrieve data from a specific location or whether data is retrieved from the location but later lost or corrupted in transmission. To remedy an observed problem, the user may need to determine its origin and take suitable measures designed to cure it.

SUMMARY

The invention relates to performing computer system diagnosis with a user-developed procedure. In a first general aspect, a method comprises receiving in a computer system executable program instructions that, when executed, cause the computer system to perform a first user-developed automated diagnostic procedure that either fails or passes depending on at least one condition in the computer system. The computer system has stored therein a program 1) that, when executed, performs a plurality of preconfigured automated diagnostic procedures and 2) that is configured to accept user-developed automated diagnostic procedures. The program is executed in the computer system and in so doing the plurality of preconfigured automated diagnostic procedures and the first user-developed automated diagnostic procedure are performed.

In selected embodiments, the user-developed automated diagnostic procedure is a Business Add-In component. The plurality of preconfigured automated diagnostic procedure may be Business Add-In components.

Advantages of using the systems and techniques described herein may include any or all of the following. Improved checking of a computer system. Improved fixing of errors detected when checking a system. Improved implementation of checks and fixes. Providing customization of checks and fixes to fit a user's needs. Providing a useful user interface for handling checks and fixes. Providing increased flexibility in taking dependencies between checks into account. Providing that the most relevant or critical errors are first brought to the user's attention.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers in the various drawings indicate like elements.

DETAILED DESCRIPTION

Figure 1:
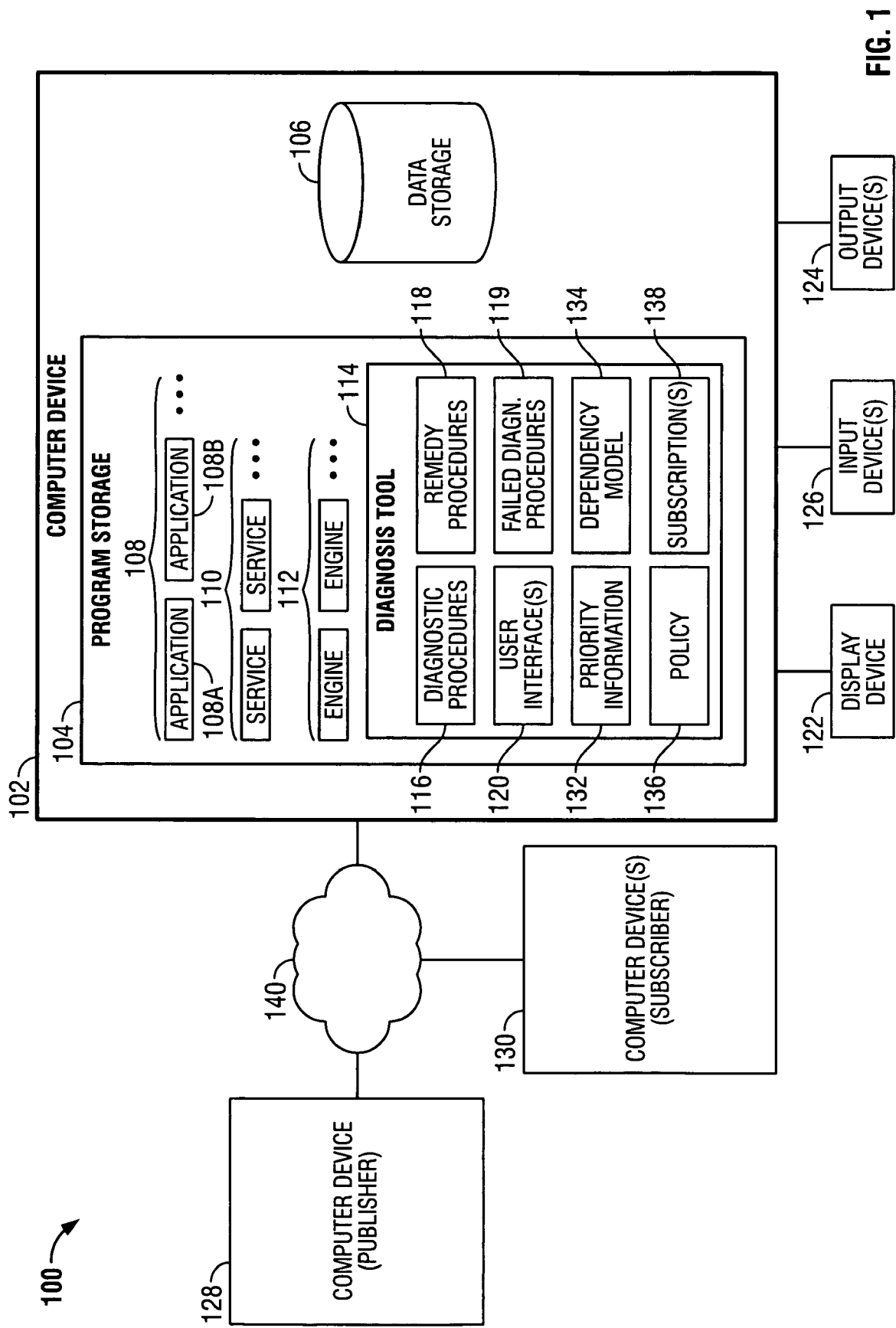
FIG. 1 is a block diagram of a computer system in which checks and fixes can be performed.

FIG. 1 is a block diagram of an exemplary computer system 100. The system 100 includes a computer device 102. The following exemplary description is largely based on a scenario wherein a user decides to investigate the computer device 102 to determine if there are any problems with its components. That is, the user wants to perform a diagnosis of the computer device 102 that may reveal whether any of its configurations, settings, and so on, need to be changed. The user may then want to change any such configuration or setting to remedy the situation. For example, the computer device 102 can be a server device for providing computer services to a number of users, such as a CRM server device.

The computer device 102 includes a program storage 104 including executable instructions, and a data storage 106. The computer device 102 includes one or more application programs 108. For example, an application 108A or 108B may relate to the CRM functionality of the computer device 102. One or more services 110 may be the basic building blocks of the applications 108, and may perform the function of managing the applications. The computer device 102 may include one or more search engines 112 for retrieving information from the data storage 106 or other repositories. In this example, the applications 108, services 110, engines 112 and the data storage 106, are the main components of the computer device 102. That is, when these components function and interact as intended, they may provide the intended functionality of the computer device 102, such as providing CRM services.

To ensure the proper function of the components, the computer device 102 may be provided with a software application program that performs diagnosis, here referred to as diagnosis tool 114. The diagnosis tool 114 includes automated diagnostic procedures 116, which are executable instructions for performing checks in the computer device 102 (the automated diagnostic procedures 116 are hereafter referred to as "checks 116"). The checks 116 may be adapted to probe specific configurations, settings, and so on, in the computer device 102 and produce a suitable output from the computer device 102 if any errors or otherwise questionable conditions are detected. Essentially, each of the checks 116 may pass or fail depending on one or more conditions in the computer device 102.

The diagnosis tool 114 includes instructions for performing one or more fixes in the computer device 102 by executing automated remedy procedures 118 (hereafter referred to as "fixes 118"). The fixes 118 are associated with individual ones of the checks 116 such that for every failing check, there is at least one fix associated with the check that can be performed. Upon performing the checks 116, computer device 102 may store identifiers 119 of failed diagnostic procedures. The identifiers 119 may be used for displaying information about errors to the user, and for identifying a fix that is associated with a failed check. Thus, a user can run the diagnosis tool 114 to determine whether there are any problems in the computer device 102 and, if so, perform a suitable fix in an attempt to overcome the problem.

The diagnosis tool 114 may include one or more graphical user interfaces (GUI) 120 that can be presented on a display device 122 connected to the computer device 102. The computer device 102 can also output information on one or more output devices 124 and receive user input with input devices 126. FIG. 1 also shows computer devices 128 and 130, as well as components 132, 134, 136 and 138 in the computer device 102, all of which will be described later.

Figure 2:
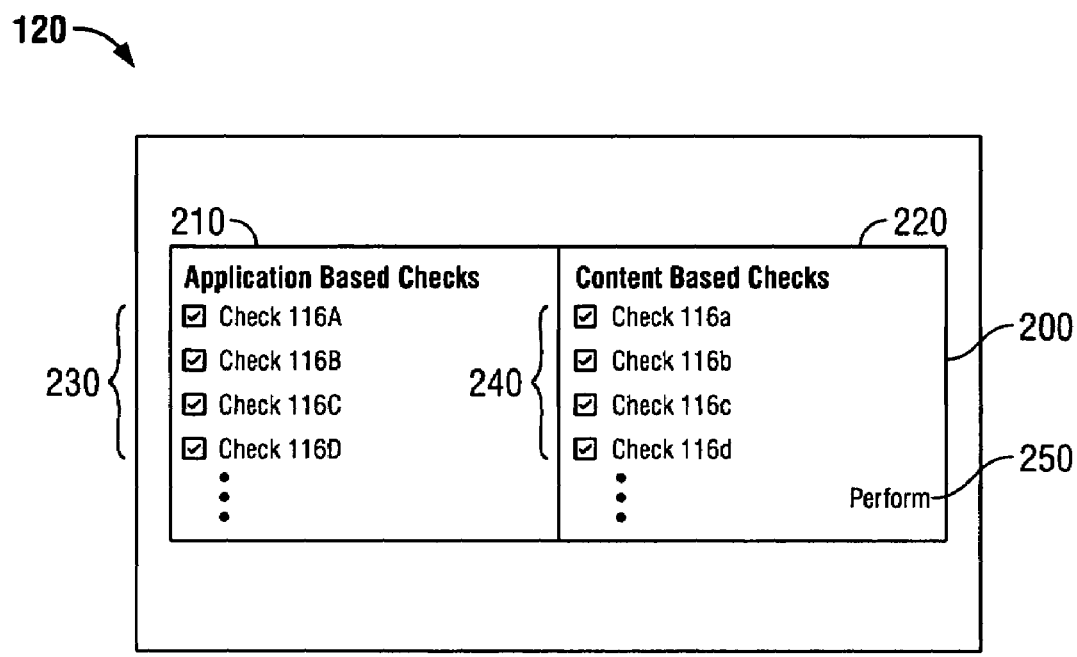
FIG. 2 is an example of a user interface for selecting checks that can be displayed by the system shown in FIG. 1.

Assume that the user initiates the diagnosis tool 114 to perform diagnosis in the computer device 102. There may be a large number of different checks 116 that can be performed, and the diagnosis tool 114 may therefore initially let the user select which checks are to be performed. FIG. 2 shows that the GUI 120 can include a check selection area 200 wherein the user can select one or more of the checks 116 to be performed in the computer device 102. For example, the user may select the checks using input device (s) 126, such as pointing device.

The check selection area 200 includes a first area 210 for selecting one or more application based checks, and a second area 220 for selecting one or more content based checks. For example, the application based checks that can be selected in the first area 210 may probe the computer device 102 for application related problems, such as erratic behavior in an application program. For example, the content based checks that can be selected in the second area 220 may probe the computer device 102 for content related problems, such as corrupt or otherwise unreliable data. In this example, identifiers 230 for checks 116A, 116B, 116C, 116D, and so on, have been selected in the first area 210. Similarly, identifiers 240 for content based checks (identified by a lower case character after the reference numeral) 116a, 116b, 116c, 116d, and so on, have been selected in the second area 220. The user can initiate the checks selected in check selection area 200 using the Perform input control 250, such as a button that the user can click on.

Upon performance of the selected checks 116, the computer device 102 may register which of the checks fail, if any, by storing the identifiers 119 of the failed checks. The computer device 102 may then display another one of the user interfaces 120 to identify the failed checks to the user. Essentially, a check fails if it does not pass upon being performed. Such a failure may indicate a more or less serious condition in the system. For example, a check failure may be informational, meaning that there is merely a message displayed to the user as a result of the check failing. A check failure may be advisory, meaning that the system recommends the user to take a certain measure, but the condition may be deemed harmless enough that no action is required. A check failure can be a warning to the user of a potentially serious problem. As a final example, a check failure may indicate a fatal system error or equivalent, meaning that the user must correct the faulty condition or risk system breakdown. Thus, the severity of a particular check failure may fall anywhere on a continuous scale of conditions that can be probed.

Figure 3A:
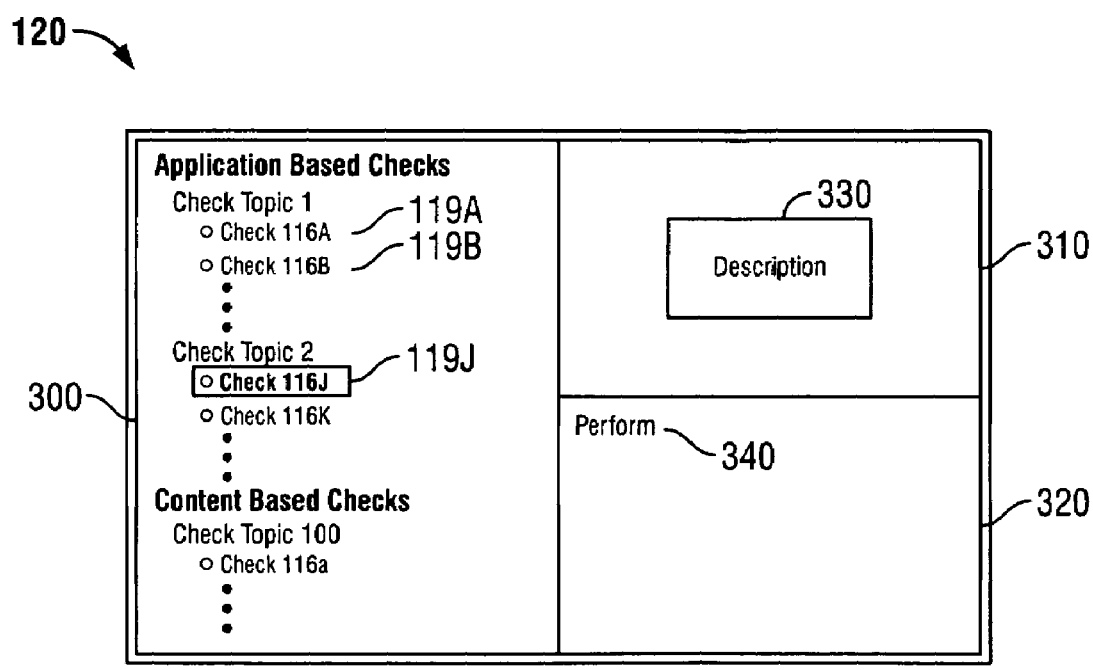
FIGS. 3A and 3B are examples of a user interface for initiating a fix for a failed check.

FIG. 3A shows one of the GUIs 120 including an identifier presentation area 300, a description area 310, and a fix performance area 320. The area 300 lists the identifiers 119 of the checks that failed. For example, identifier 119A in area 300 indicates that check 116A failed, and identifier 119B indicates that check 116B failed, and so on. When checks of more than one category are performed, the area 300 may group the identifiers of failed checks according to those categories, such as application based checks and content based checks in this example. Moreover, the area 300 may group the identifiers of failed checks according to one or more check topics in each category, such as "Check Topic 1" and "Check Topic 2" in this example.

The identifiers 119 of the failed checks are displayed in the area 300 to inform the user that the checks have failed and let the user select any of the failed checks for performing a fix associated therewith. Each of the checks 116 has at least one of the fixes 118 associated with it. Accordingly, a user can select any of the failed checks in the area 300 and perform an associated fix to try and overcome the problem that may have caused the check to fail.

Each of the checks 116 or fixes 118 may include a description 330 of the potential problem that causes the check to fail. The description 330 may be displayed in the description area 310 upon the user selecting the check on area 300. For example, the user may review the description 330 to better understand what the selected check is diagnosing and what problems may cause it to fail.

A Perform input control 340 in the fix performance area 320 lets the user initiate the fix 118 that is associated with the selected check 116. That is, when the user activates the input control 340 after having selected one of the failed checks in area 300, the computer device 102 will initiate the fix 118 that is associated with the selected check. This means that the user does not have to know or memorize which of the fixes 118 are associated with individual ones of the checks 116. Moreover, the user interface 120 provides a single convenient input control for initiating any of the fixes 118.

Some of the fixes 118 may require user input. In this example, the user selects in area 300 an identifier 119J that indicates failure of the check 116J. User selection is indicated by the rectangle enclosing the selected identifier. The user thereafter activates input control 340. This causes a predetermined user input to be received in the computer device 102. In response to receiving the input, the computer device 102 performs the one of the fixes 118 that is associated with the failed check 116J. Here, the associated fix does not require user input. Rather, the associated fix may be adapted to change or update one or more configurations, settings, and so on, in the computer device 102. For example, the failed check 116J may determine whether the application 108A is properly configured to work with one of the services 110. If it is determined, upon performing the check 116J, that the configuration is not properly set, the configuration can be altered by executing instructions included in the associated fix. That is, the associated fix can include instructions for setting the configuration for proper interaction between the application 108A and the service 110.

Figure 3B:
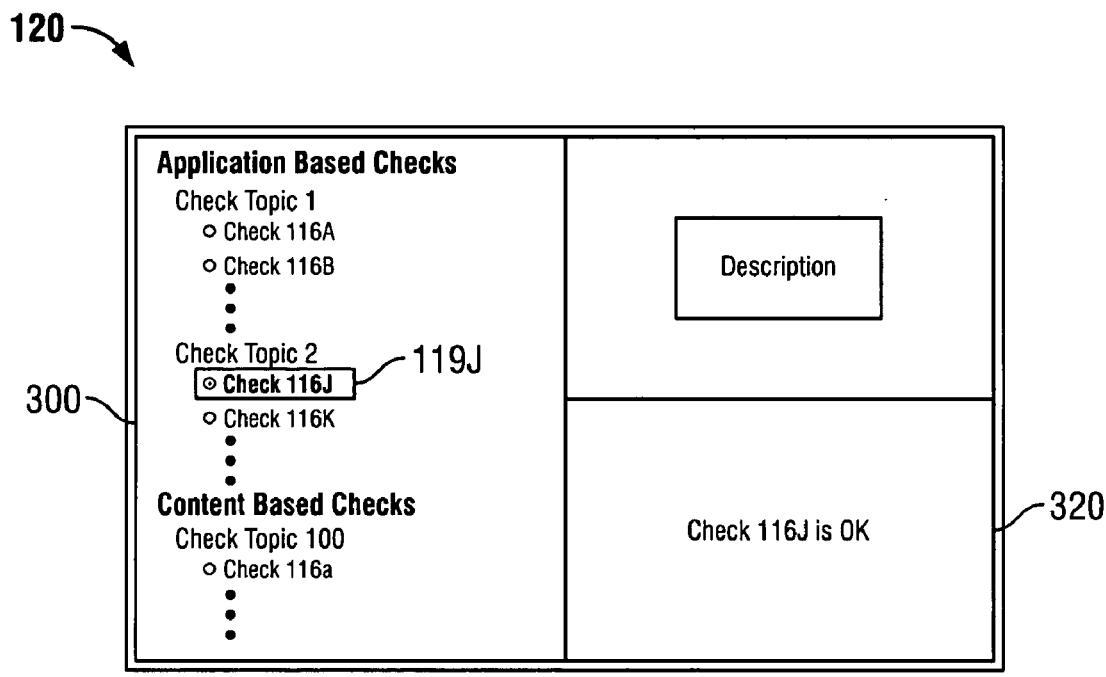

After the associated fix has been run, the failed check 116J may again be performed to determine if the problem remains. That is, if the check 116J fails after the associated fix has been performed, this indicates that the problem causing the check to fail has not been resolved. If, on the other hand, the check 116J passes after the associated fix is performed, this suggests that the problem has been resolved by performing the fix. In this example, performing the fix resolves the problem that causes the check 116J to fail (such as improper configuration), and a message to this effect is displayed in the fix performance area 320. The fact that the check 116J no longer fails may also be indicated in check selection area 300. For example, when check failure status is indicated by unfilled bullets in the identifiers, the identifier can be changed to include a filled bullet to indicate that the check now passes. FIG. 3B shows the check selection area 300 wherein the identifier 119J has been provided with a filled bullet that distinguishes it from the other, failed, checks.

Figure 4A:
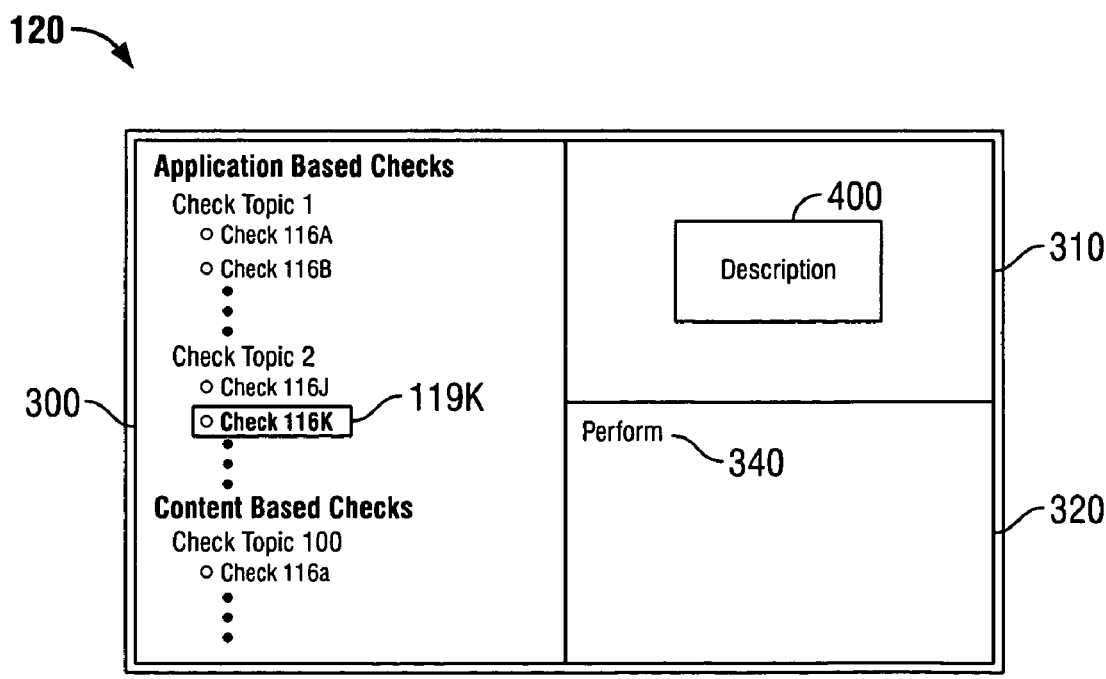
FIGS. 4A-D are examples of a user interface for initiating a guided-procedure remedy procedure.

Other fixes, in contrast, may require user input. Assume, for example, that the user selects an identifier 119K representing failed check 116K in the check selection area 300 as shown in FIG. 4A. This may cause a description 400 of the failed check 116K or the problem that possibly causes it to fail to be presented in description area 310. Here, the one of the fixes 118 that is associated with the failed check 116K is different from the fix that is associated with the failed check 116J that was described above. Nevertheless, the user can initiate the fix associated with check 116K by selecting the same Perform input control 340 in fix performance area 320. That is, upon receiving the predetermined input that is generated upon user selection of the control 340, the computer device 102 launches the one of the fixes 118 that is associated with the currently selected failed check in check selection area 300.

Figure 4B:
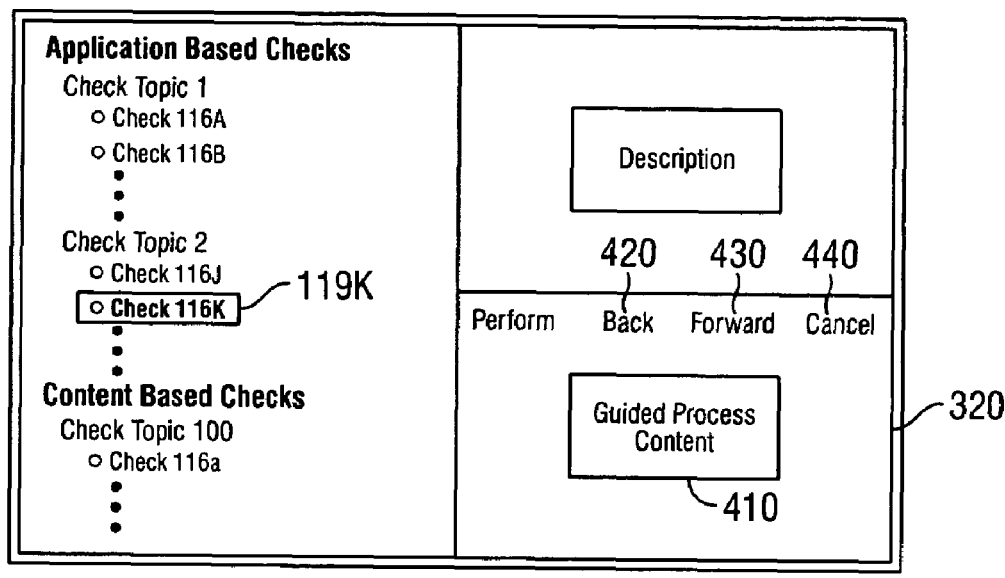
Figure 4C:
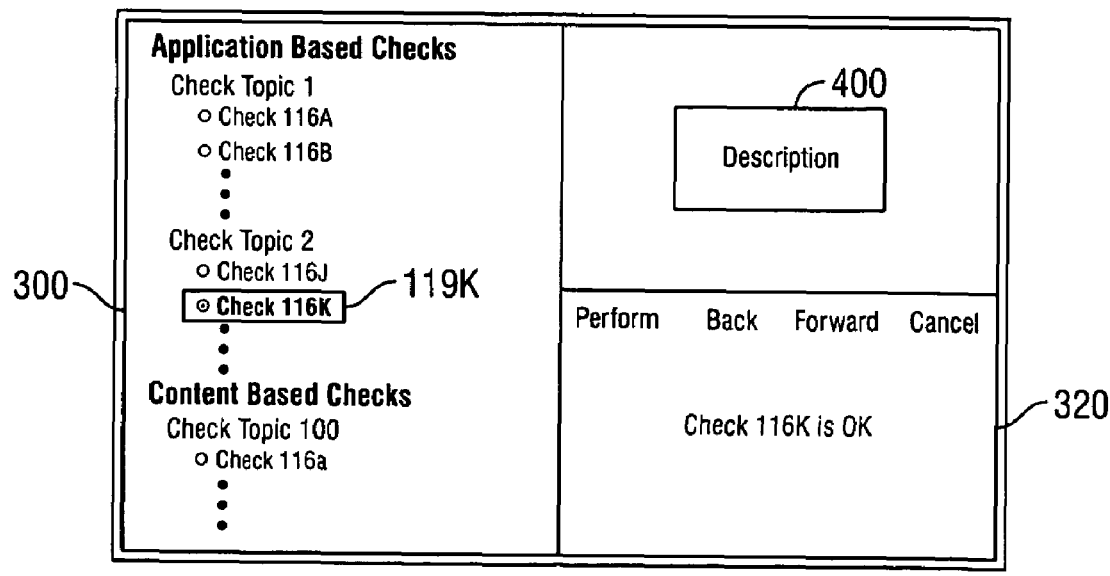

The fix associated with the failed check 116K is a guided process that requires some user input. That is, upon performance of the associated fix, guided process content 410 may be displayed in fix performance area 320 as shown in FIG. 4B. For example, the guided process content 410 may be a trouble-shooting procedure that is designed to identify a problem source that may have caused the check 116K to fail. When the trouble-shooting procedure includes several steps, the guided process content 410 may be sequentially displayed in the fix performance area 320 so that the user can go through the guided steps in order. For example, a trouble-shooting procedure may ask the user for input of information that the computer device 102 cannot determine by itself. The user may enter the requested information using input devices 126 (see FIG. 1). The user may activate user selectable Back and Forward commands 420 and 430, respectively, to navigate within the guided steps. The user may also cancel the performed fix using a Cancel input control 440. After the guided process is performed, the check 116K is again performed to determine whether it now passes or still fails. In this example, check 116K passes after the associated fix is performed, and a message to this effect is displayed in fix performance area 320, as shown in FIG. 4C. The identifier 119K in check selection area 300 may be provided with a filled bullet to distinguish it from the other checks, as shown. When the check 116K passes, the user may select another one of the failed checks in identifier presentation area 300 to perform a fix that is associated with it.

Figure 4D:
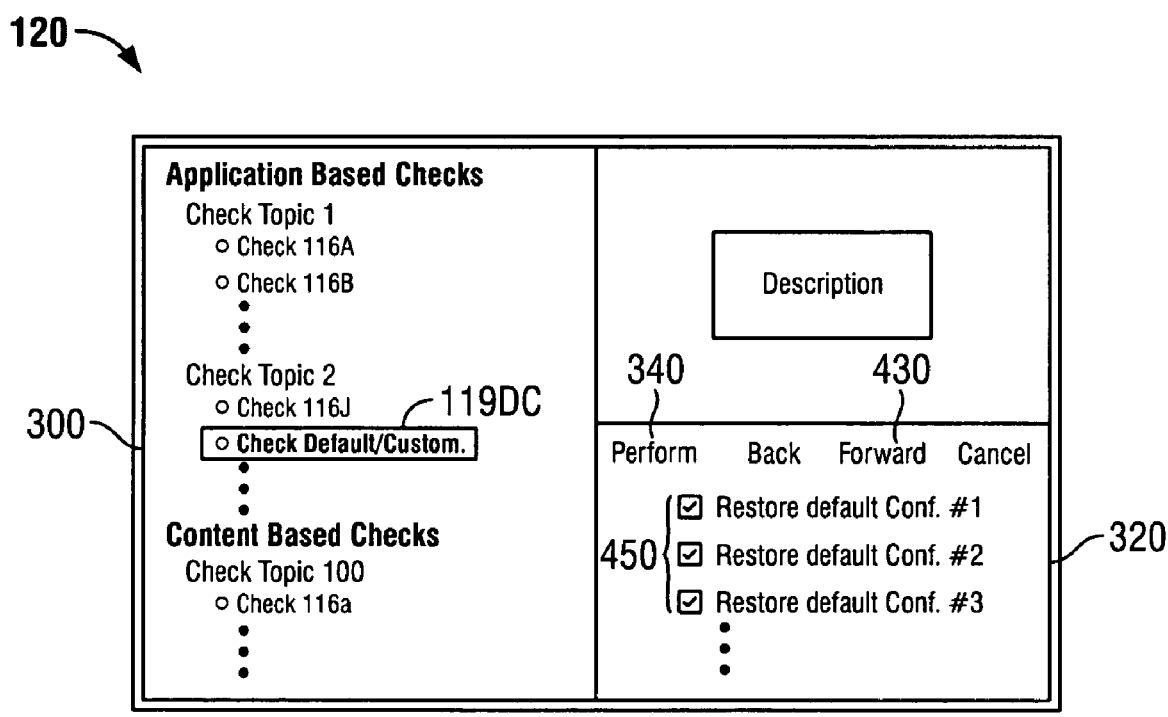

It may be desirable for a user to customize certain settings, for example, as part of fine tuning the computer device 102. However, the presence of non-default values in configuration settings can make it more difficult to identify and resolve problems that occur in the computer device 102, particularly during installation of components therein. The diagnosis tool 114 also may let the user restore customized configuration settings to their default values. For example, one of the checks 116 can determine whether any configuration settings have been changed from their default values. The check may be referred to as a default configuration/customizing check and if any customized settings are detected, an identifier 119DC may be listed in the identifier presentation area 300 as shown in FIG. 4D. By selecting the identifier 119DC, the user will be able to initiate restoration back to default values using the control 340. If the user selects the control 340, a list 450 is displayed in fix performance area 320 for the user to select the settings that are to be reverted to default values. If the user selects the Forward input control 430, the computer device 102 will restore the selected settings to their default values.

Figure 5:
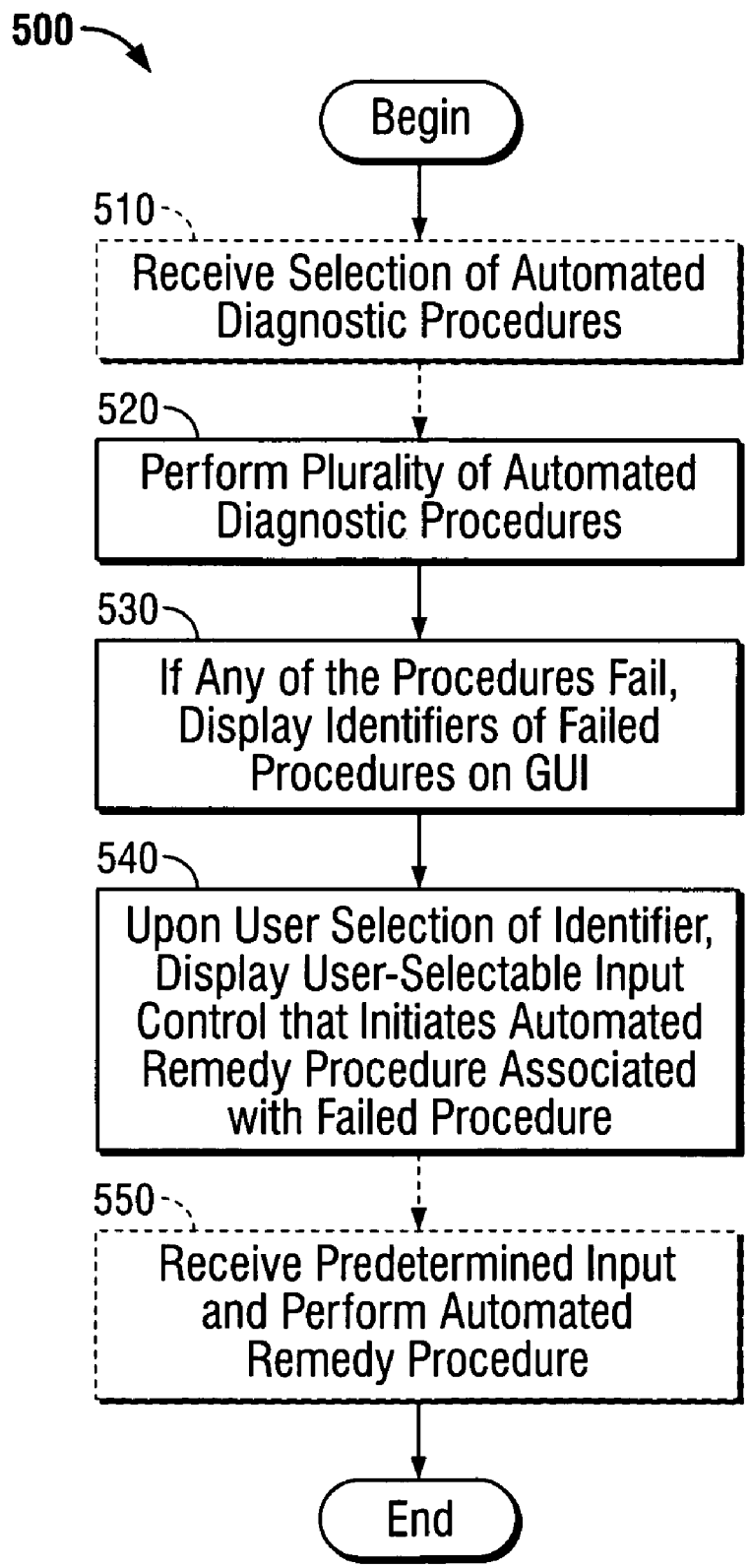
FIG. 5 is a flow chart of a method of performing diagnosis in a computer system.

FIG. 5 is a flow chart of a method 500 according to an embodiment of the invention. Preferably, the method 500 is performed in the system 100. For example, a computer program product can include instructions that cause a processor to perform the steps of method 500. The following steps are included in method 500:

Receiving, in optional step 510, a user selection of automated diagnostic procedures to be performed in the computer system. For example, the computer device 102 can receive a user selection of checks made in check selection area 200 as shown in FIG. 2.

Performing, in step 520, a plurality of automated diagnostic procedures in a computer system. Each of the automated diagnostic procedures either fails or passes depending on at least one condition in the computer system. For example, the computer device 102 can perform all or some of the checks 116.

If any of the automated diagnostic procedures fail, displaying, in step 530, identifiers of failed automated diagnostic procedures on a GUI. The identifiers are displayed for selection by a user. For example, the identifiers 119 of failed checks can be displayed in identifier presentation area 300 as shown in FIGS. 3A-B and 4A-D.

Upon user selection of a displayed identifier, displaying, in step 540, a user-selectable input control on the GUI. The user-selectable input control initiates an automated remedy procedure that is associated with the failed automated diagnostic procedure. In the above-described examples, the user selects identifier 119J in FIG. 3A, identifier 119K in FIG. 4A and identifier 119DC in FIG. 4D. For example, the Perform input control 340 is displayed in FIGS. 3A, 4A and 4D.

Receiving, in optional step 550, a predetermined user input by the user selecting the displayed input control, and performing the automated remedy procedure associated with the failed automated diagnostic procedure in response to receiving the input. For example, the fix associated with the check selected in FIG. 3A was performed and the result thereof shown in FIG. 3B. As another example, the fix associated with the check selected in FIG. 4A was performed as shown in FIG. 4B, and the result thereof illustrated in FIG. 4C.

The order in which the checks 116 are performed, or in which the fixes 118 are performed, or both, may be important. The computer system 100 may therefore include priority information 132 that specifies an order in which to perform one or more of these. In FIG. 1, the priority information 132 is stored on the computer device 102. As will be described below, the computer device 102 may receive the priority information 132 from a publisher computer device 128 according to a subscription 138. The computer device 128 also may provide the priority information 132 to another (subscriber) computer device 130.

Figure 6:
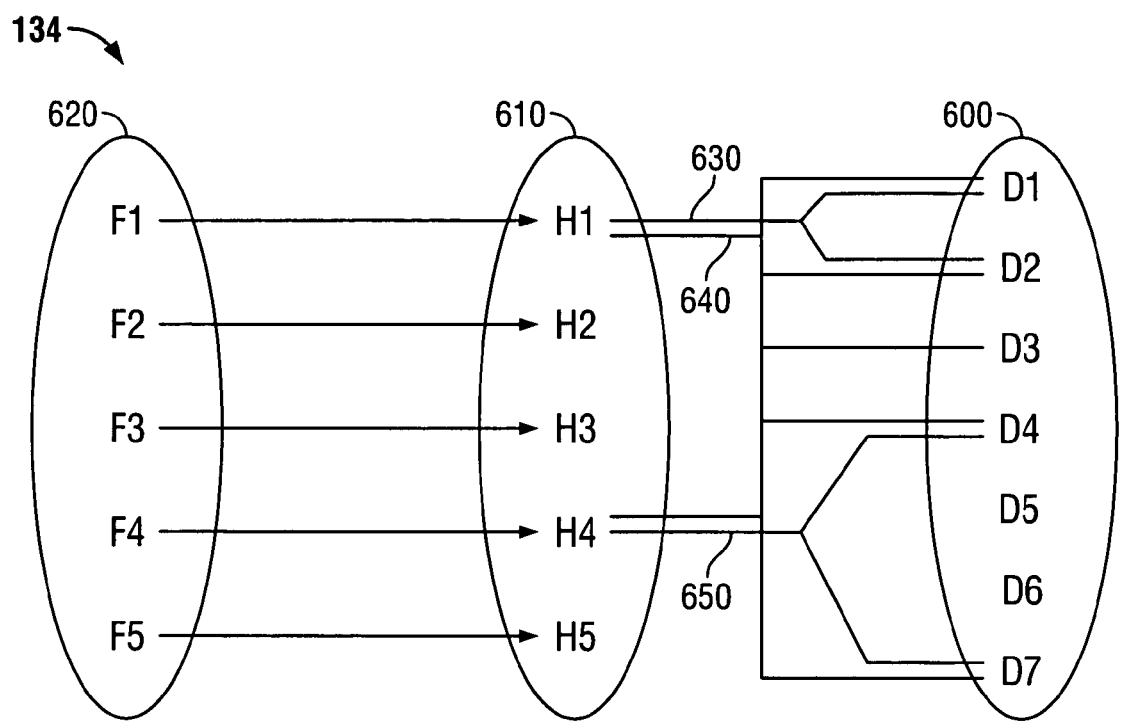
FIG. 6 is a conceptual view of a dependency model

The priority information 132 may be created based on a dependency model 134 (stored on the computer device 102 in FIG. 1). FIG. 6 shows a conceptual view of the dependency model 134. The dependency model 134 shows an example of relationships, also referred to as dependencies, between a data base 600 of observed data, a problem space 610 of identified problems and a fix space 620 of fixes implemented to address the identified problems and observed data. In the exemplary dependency model 143, problems H1-H5 in problem space 610 have been identified. For example, each of problems H1-H5 may be an application related problem or a content related problem in a computer system. A user who is analyzing the computer system has observed that certain data occur in connection with the identified problems. These relationships between observed data and identified problems are indicated by the lines drawn between the data space 600 and problem space 610. Particularly, relationship 630 indicates that data D1 and D2 are observed when problem H1 is noticed. Relationship 640 indicates that problems H1 and H4 may both be noticed when facts D1-D4 and D7 are observed in the system. Similarly, relationship 650 indicates that the problem H4 may occur when data D4 and D7 are observed in the system. Thus, identifying the relationships 630, 640 and 650 may be useful in analyzing the causes of problems that are observed.

Based on the identified relationships between problems and data, the user may formulate fixes to address the identified problems. In the exemplary dependency model 134, a user has implemented fix F1 to address problem H1, a fix F2 to address the problem H2, and so on with fixes F3, F4 and F5. Thus, the dependency model 134 lets a user analyze what data are observed in connection with identified problems, and to formulate and implement suitable fixes to address the identified problems. The dependency model 134 may be used for specifying an order in which checks are to be performed in a system, or an order in which failures of performed checks are to be addressed, or both.

Figure 7:
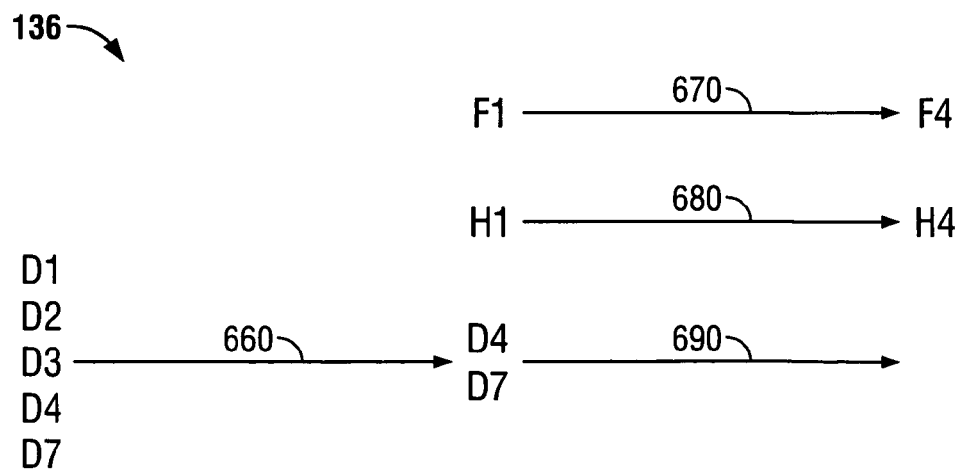
FIG. 7 is a conceptual view of a policy.

For example, the dependency model 134 may be used in formulating a policy 136, which is also stored on the computer device 102 in the FIG. 1 example. The policy 136 may specify in which order fixes are to be performed given observation of a particular set of data. An example of the policy 136 is shown in FIG. 7 and may be interpreted in a left-to-right manner. Specifically, at the left side of policy 136, data D1-D4 and D7 are observed in the system. Using the terminology of the dependency model 134, the data identified in the policy are observed in the data space 600. Moving right in policy 136, it is specified at the top of the policy that fix F1 is to be performed upon observation of the data identified to the left. Again using the FIG. 6 terminology, fix F1 belonging to fix space 620 is performed to address a problem H1 in the problem space 610 (also shown at the center of policy 136). Still referring to the center of policy 136, it is shown that performing the fix F1 results in only data D4 and D7 being observed in the system, with the data D1-D3 now no longer being observed. Accordingly, performing the fix F1 to address the identified problem H1 leads to a reduction in the set of observed data as indicated by the arrow 660 in FIG. 7.

With only the data D4 and D7 now being observed in the system, the policy 136 indicates that fix F4 is to be performed to address the problem H4, as indicated at the right side of policy 136. That is, the policy 136 specifies a move in the fix space 620 from fix F1 to fix F4, as indicated by arrow 670. Similarly, the policy 136 indicates that this first addresses the problem H1 and thereafter addresses the problem H4, as indicated by arrow 680. Performing the fix F4, then, in this example leads to no more observations of problematic data. That is, the data D4 and D7 which were observed before performing the fix F4, no longer occur. This move in the data space 600 from observed data D4 and D7 to the empty set is indicated in FIG. 7 with the arrow 690. Accordingly, the policy 136 may be used in specifying the order of performing the checks 116, or the fixes 118, or both.

One purpose of the analysis on which the dependency model 134 and/or the policy 136 is based, may be to identify a better order of performing checks or addressing their failures. If the checks 116 are performed without regard for the dependencies that may exist between them, the results of performing the checks may be less reliable. For example, assume that one of the checks 116 is adapted to determine whether data transfer can take place between the application 108A and one of the engines 112 (see FIG. 1). Assume further that another one of the checks 116 is adapted to determine whether data provided from the engine 112 to the application 108A is reliable and not corrupt. Assume now that the second of these checks fails upon being performed. This indicates that the application 108A does not receive the data that it should receive from the engine 112. This may indicate that data corruption has occurred. However, this behavior may alternatively be caused by there not being any viable communication between these two components, a condition that can be detected with the first mentioned of these two checks. Accordingly, it may be useful to first perform the check that determines the existence of the viable communication between the components, and resolving any problem identified by that check. Then, one may run a check on the quality of data transferred by the communication. It will be understood that other checks may have other types of dependencies in view of the diagnosis they are adapted to perform.

Figure 8A:
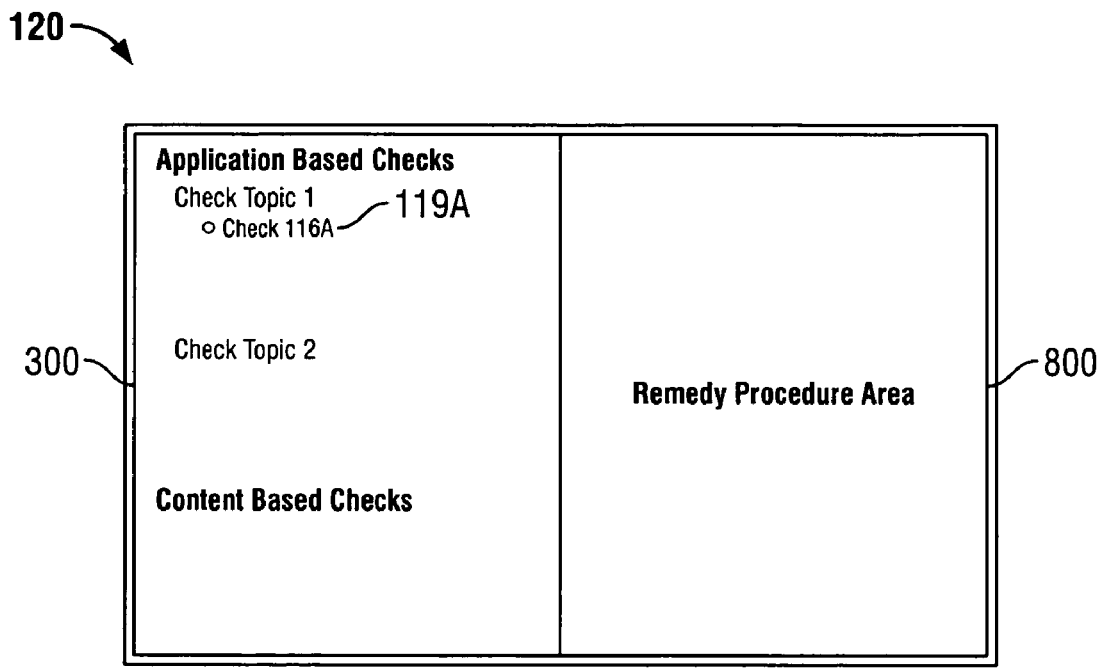
FIGS. 8A and 8B are examples of a user interface where checks can be performed according to priority information.
Figure 8B:
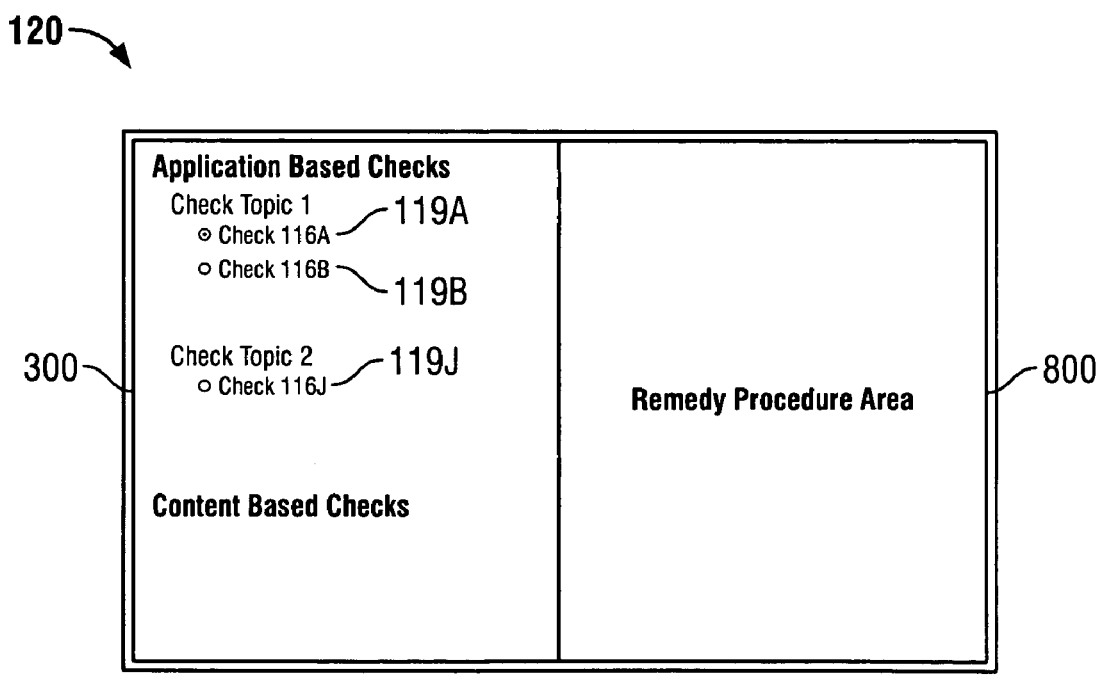

An example of performing checks in a specified order will now be given with reference to FIGS. 8A and 8B. In this example, the priority information 132 specifies an order in which the checks 116 are to be performed. The priority information 132 may have been formulated using the analysis involved in creating the dependency model 134 and policy 136 as described above. Here, the priority information 132 specifies that check 116A is to be performed first of the checks 116. For example, the check 116A is selected to be performed first of the checks 116 because it may be able to identify a problem that, unless corrected before other checks are run, might lead to systematic failures of other checks. That is, it has been determined that it may be desirable to begin the diagnosis procedure with running check 116A and the priority information 132 therefore specifies that the diagnosis is to begin with this check. The computer device 102 therefore begins by performing that check which fails in this example. The GUI 120 therefore lists the identifier 119A in the identifier presentation area 300 as shown in FIG. 8A.

The user selects the identifier 119A in the identifier presentation area 300 and can thereafter initiate the one of the fixes 118 that is associated with this check. A remedy procedure area 800 of the GUI 120 may provide information about the check and input controls necessary to perform the fix. For example, the remedy procedure area 800 may include the information area 310 and the fix performance area 320 as described above with reference to FIG. 3A. The remedy procedure area may provide a guided process, for example as described above with reference to FIGS. 4A-C.

After the associated fix is performed, check 116A may again be performed to determine whether it passes or fails following performance of the fix. In this example, the associated fix resolves the problem that initially caused the check 116A to fail. Accordingly, the identifier 119A now is provided with a filled bullet to indicate that the check passes.

The priority information 132 specifies which checks to perform after the initial check 116A. In this example, it is specified that checks 116B and 116K are to be performed next. Accordingly, these checks are performed and, in this example, they fail. As a result, indicators 119B and 119J are displayed in the area 300 as shown in FIG. 8B. The user can now select either of the failed checks 116B and 116J and initiate the corresponding fix as described above. Accordingly, priority information lets the user perform the checks in the specified order, with user intervention for any checks that fail.

In some implementations, the priority information 132 may include a matrix of correlation probabilities. The matrix may be considered a mathematical version of the conceptual dependency model 134 shown in FIG. 6. An exemplary matrix is shown in Table 1 below.

TABLE 1

| Check No. | Dependency on 116A | Dependency on 116B | Dependency on 116J |
|---|---|---|---|
| 116A | — | .1 | .2 |
| 116B | .8 | — | .1 |
| 116J | .9 | .2 | — |

A typical implementation may involve a great number of checks, but the first column of Table 1 lists only three checks, 116A, 116B and 116J, for clarity. The second column lists the dependency values by which each check depends on check 116A. The higher dependency value a check has, the more likely it is that this check is dependent on check 116A. A check that is highly dependent on check 116A preferably should be performed after check 116A, such that the problem for which check 116A probes does not inadvertently cause failure of the check that depends on check 116A. The dependency values, or correlation probabilities, in this example, are values between 0 and 1.

The dependency values for checks 116B and 116J with regard to check 116A are 0.8 and 0.9, respectively, as listed in the second column. These values may be interpreted thus: when check 116A fails, the probability that check 116B also fails is 0.8. The probability that check 116J fails, given the assumption that check 116A fails, is 0.9. On the scale from 0 to 1, these are relatively high numbers that indicate a large amount of dependency. The third column of Table 1 lists the dependency values with regard to check 116B. Here, checks 116A and 116J have relatively low dependency values, 0.1 and 0.2 respectively, which indicate that these two checks do not depend on check 116B to any great extent. A low dependency means that a check can be placed before or after another check. Finally, the fourth column of Table 1 lists the dependency values with regard to the check 116J. Checks 116A and B both have relatively low values, 0.2 and 0.1, which indicate a low level of dependency on this check.

A matrix of correlation probabilities such as the exemplary one shown in Table 1 can be used to decide the order in which individual checks are performed. Preferably, a threshold dependency value is specified and any correlation probability that matches or exceeds this number is deemed to be an existing dependency. That is, any check that has at least the threshold correlation probability of depending on another check will be placed after that check in the specified order. Assume, for example, that the dependency value 0.7 is chosen as the threshold. It is seen that checks 116B and 116J have correlation probabilities for check 116A that exceed the threshold. Accordingly, check 116A should be performed before checks 116B and 116J in such an example.

The matrix in Table 1 may be periodically updated to improve the accuracy of the correlation probabilities. Different events occurring in the performance of checks may be taken into account in updating the matrix. For example, when several checks are performed and more than one of them fails, the matrix may be updated to increase the probability values for the checks that fail at the same time. Generally, failure of two or more checks at the same time may indicate that some or all of those checks are dependent on each other. The matrix or correlation dependencies for the involved checks may therefore be updated to increase their dependencies on each other.

Other events also may warrant adjustment of the matrix. For example, when the user initiates a certain fix following failure of one or more checks, this may resolve one or more errors that caused failure of a check with which the fix is not associated. However, it may also happen that initiating a fix causes additional checks to fail. Each of these events, the elimination of a check failing error or the failure of additional checks, should be taken into account by updating the matrix of correlation probabilities. Particularly, these events may be given a greater weight in adjusting the dependency values than the simultaneous failure of several checks. For example, a fix associated with a first check also resolves the failure of another check, suggests that the second check has a certain dependency on the problem probed by the first check. Accordingly, the dependency values may be updated to reflect this indication of dependency between the checks.

In some implementations, the correlation values are calculated by dividing the number of coincidences—how often two checks have failed together—with the total number of times one of the checks has been performed. The resulting fraction may then be used as a dependency value for that check. The other check may have a different correlation probability, because it's value is calculated by dividing the same total number with the number of times that check has been performed. These and other approaches to calculating the correlation probabilities may be weighted to give priority to certain collected data. For example, very recent check failures may be given more weight that those that occurred a long time ago.

The priority information 132 may provide flexibility for a user of the system. For example, the computer device 102 may provide that a user can specify all dependencies in the priority information 132, for example, through a suitable GUI 120. In such case, the order of performing the checks or addressing their failures may remain indefinitely for this set of checks. As another example, the computer device 102 can display the priority information 132 as an initial setting to the user, who can select certain of the relationships (dependencies) to remain unchanged during operation. Any dependency not so selected may be subject to updating, for example, as described above. As yet another example, the user can let the diagnosis tool 114 begin with a default priority information 132 and update any of the dependencies as necessary. As yet another example, the user may specify the order of performing the checks, or addressing their failures, by making a suitable input, for example, aided by one of the GUIs 120.

It has been described above how the priority information 132 advantageously can be updated from time to time based on the actual behavior of a system in which the diagnosis is being performed. If several systems that have identical or similar components are being diagnosed with the diagnosis tool 114, it may be desirable to share the updated versions of the priority information 132. This may let other users and systems benefit from the increased knowledge about check dependencies that is embodied in the updated priority information 132.

A publisher/subscriber system may therefore be created, which will be described with reference again to FIG. 1. A publisher computer device 128 may be responsible for distributing the priority information 132 among a number of computer devices that subscribe to such information, for example the computer device 102 and one or more other exemplary subscriber computer devices 130. The communication between these devices may be facilitated through a network 140, which may be a local area network, wide area network, the Internet, or any other network. For example, when a user decides to perform diagnosis in the computer device 102, such as in connection with installation of a new component, a subscription 138 may be used for retrieving the priority information 132 from the publisher computer device 128. This ensures that the priority information 132 is the most up-to-date version available for the computer device 102. Moreover, when checks and fixes are being performed in the computer device 102, the priority information 132 may be updated as has been described above. The updated priority information 132 may be a better and more accurate version than was used initially. The subscription 138 may therefore also provide that the computer device 102 should publish the updated priority information 132. That is, the computer device 102 may transmit the updated priority information to the publisher computer device 128 which, in turn, can publish the updated priority information 132 for use by other subscribers, such as the subscriber computer device(s) 130. Accordingly, subscriptions from the publisher computer device 128 may allow several subscribers in system 100 to receive priority information that is the most current information available regarding the proper sequencing of checks and fixes in the diagnosis tool 114, and to share updated versions of such priority information such that also other subscribers can benefit from them.

Figure 9:
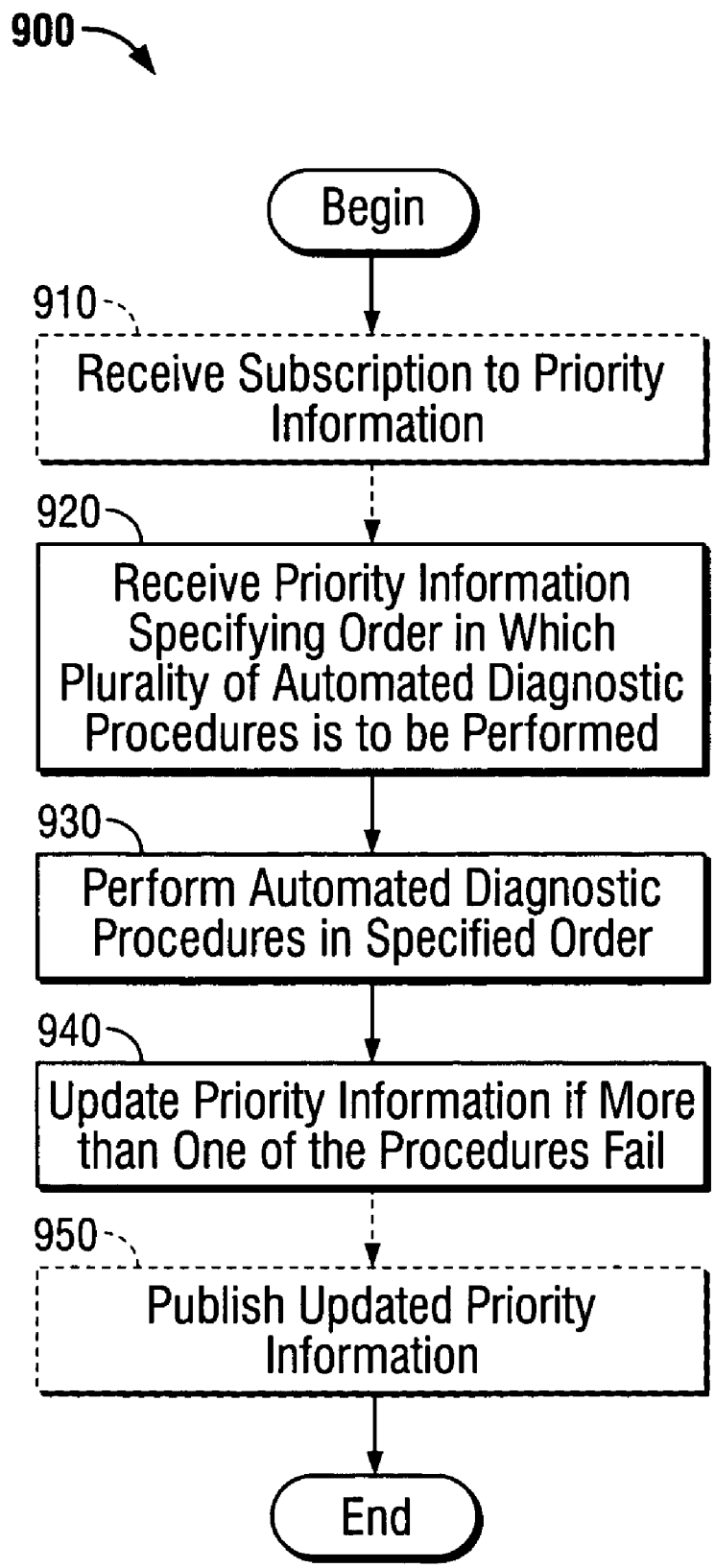
FIG. 9 is a flow chart of a method of executing a diagnosis program.

FIG. 9 is a flow chart of a method 900 of executing a diagnosis program including multiple procedures wherein the diagnosis program does not specify an order in which the procedures are executed. Preferably, the method 900 is performed in system 100. For example, a computer program product can include instructions that cause a processor to perform the steps of method 900. The following steps are included in method 900:

Receiving, in optional step 910, a subscription to priority information. For example, the computer device 102 can receive the subscription 138 by which it can retrieve the priority information 132 from the publisher computer device 128.

Receiving, in step 920, priority information specifying an order in which a plurality of automated diagnostic procedures is to be performed in a computer system. For example, the computer device 102 can receive the priority information 132 that specifies an order in which the checks 116 are to be performed. For example, the priority information 132 may be received from the publisher computer device 128.

Performing, in step 930, the plurality of automated diagnostic procedures in the specified order. Each of the plurality of automated diagnostic procedures passes or fails depending on at least one condition in the computer system. For example, the checks 116 can be performed in the computer device 102, and each of them may pass or fail depending on the presence or absence of particular problems in the computer device 102.

Updating, in step 940, the priority information if more than one of the plurality of automated diagnostic procedures fail. For example, the priority information 132 can be updated if more than one of the checks 116 fail.

Publishing, in optional step 950, the updated priority information. For example, the computer device 102 can publish the updated priority information 132 to the publisher computer device 128.

It was described above how the priority information 132 may be used in determining an order of performing the checks 116. As another example, the priority information 132 may be used for specifying the order in which failures of the checks 116 should be addressed. That is, when several of the checks 116 fail upon being performed, the priority information 132 can be used in determining which of the failures should first be addressed. For example, this may let the user focus on first resolving the most critical errors, without being distracted by other checks that may have failed due to their dependency on the check probing for the most critical error.

Figure 10A:
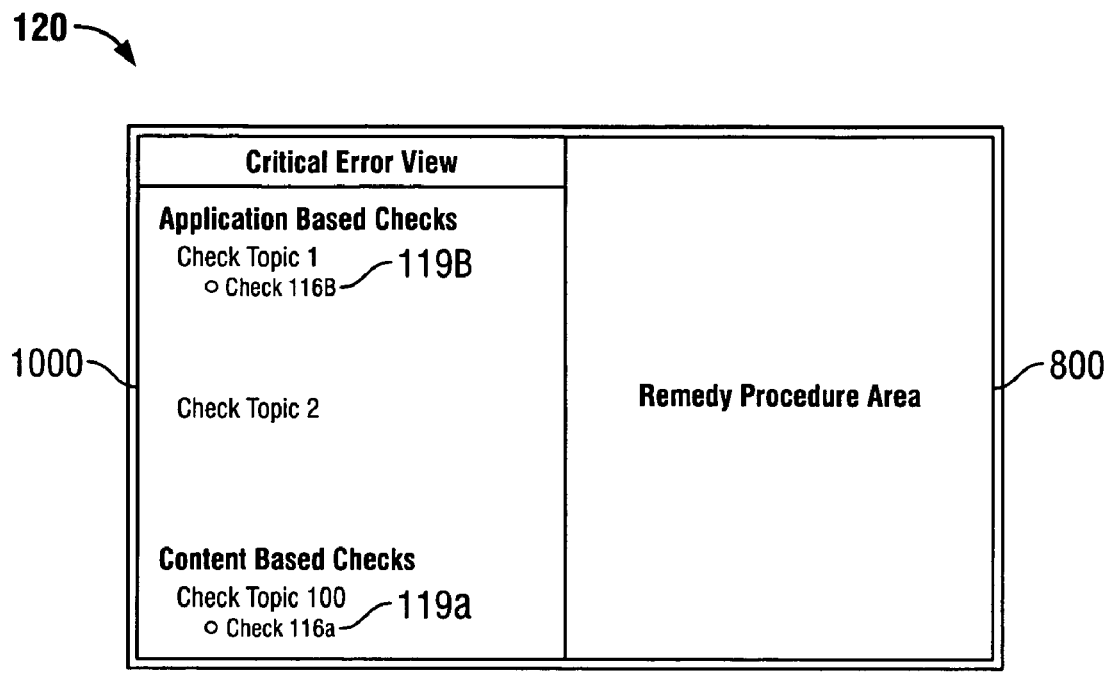
FIGS. 10A and 10B are examples of a user interface where a subset of failed checks is displayed based on priority information.

FIG. 10A shows the GUI 120 having an identifier display area 1000 that displays only the identifiers of the most critical failed checks at first. The identifier presentation area 1000 may be considered a "critical error view", and is labeled as such in the figure. In this example, checks 116B and 116a are the two most critical failed checks according to the priority information 132. The identifiers 119B and 119a are therefore the only identifiers currently listed in the area 1000. The user may select either of the displayed identifiers and initiate fixes associated with the failed checks. Fixes may be initiated in remedy procedure area 800 substantially as described above with reference to FIG. 8A. For example, the initiated fix may display information regarding the probable error and may or may not require user input.

Figure 10B:
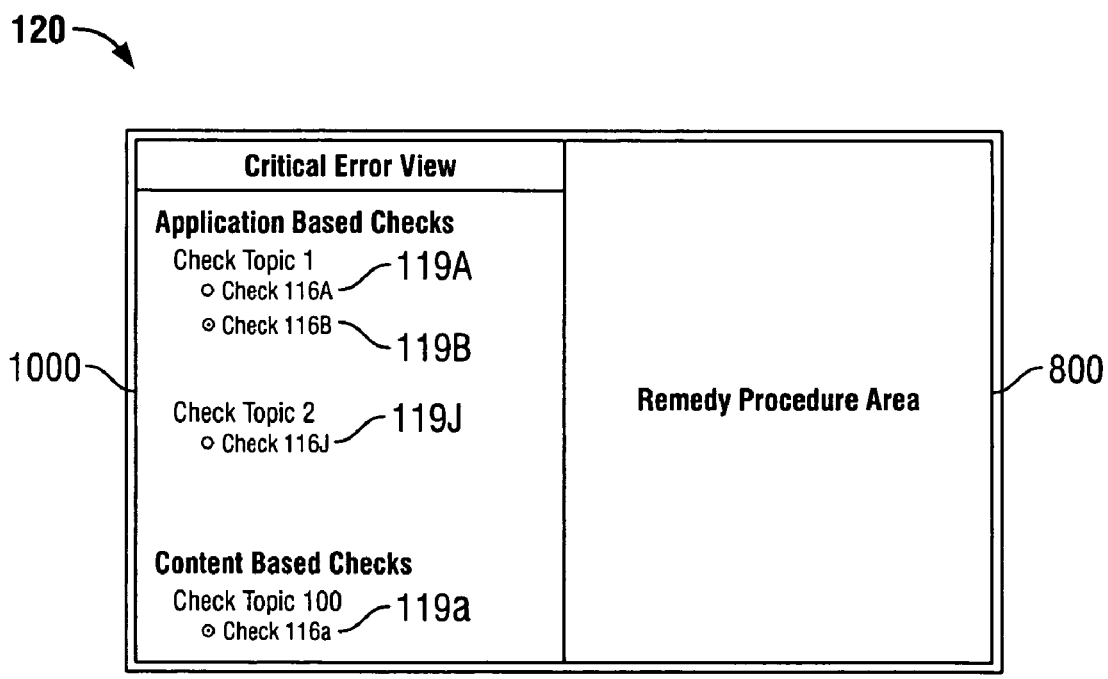

After performing the associated fixes, the checks 116B and 116a are again performed to determine whether they pass or fail. In this example, the checks now pass, as indicated by the identifiers 119B and 119a being provided with filled bullets in FIG. 10B. According to the priority information 132, failed checks 116A and 116J are next to be addressed, and identifiers 119A and 119J are therefore displayed in the area 1000 as shown in FIG. 10B. The user may now continue by selecting either of checks 116A or 116J and performing their associated fixes using the remedy procedure area 800. If there are additional failed checks, one or more identifiers for them may be presented in area 1000 after the currently listed failed checks have been resolved.

Figure 11:
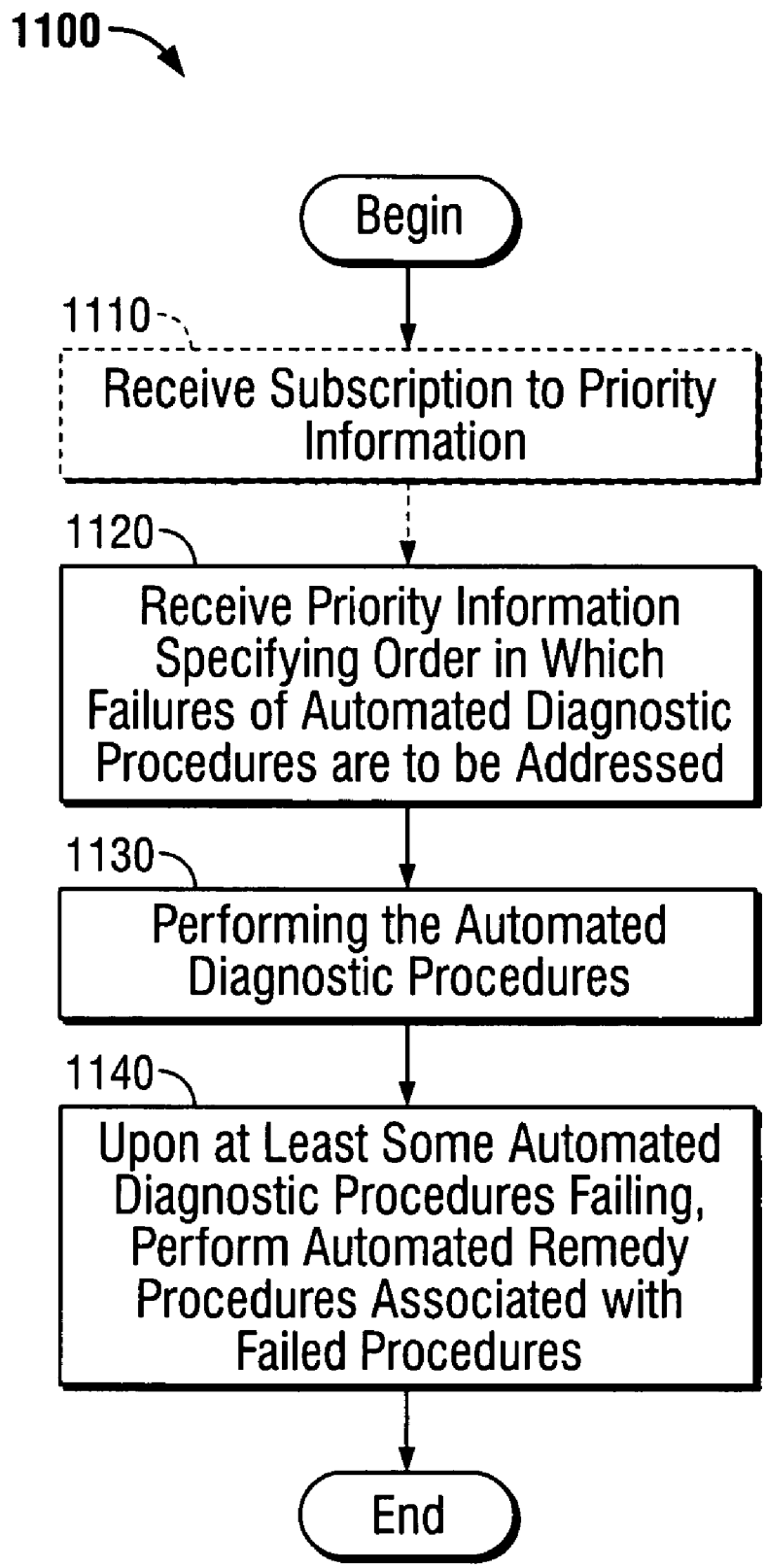
FIG. 11 is a flow chart of another method of executing a diagnosis program.

FIG. 11 is a flow chart of a method 1100 of executing a diagnosis program including multiple procedures associated with remedy procedures wherein the diagnosis program does not specify an order in which the remedy procedures are executed. Preferably, the method 1100 is performed in the system 100. For example, a computer program product can include instructions that cause a processor to perform the steps of method 1100. The following steps are included in method 1100:

Receiving, in optional step 1110, a subscription to priority information. For example, the computer device 102 can receive the subscription 138 for receiving the priority information 132 from a publisher.

Receiving, in step 1120, in a computer system wherein a plurality of automated diagnostic procedures is performed, priority information specifying an order in which failures of any of the plurality of automated diagnostic procedures are to be addressed. For example, the computer device 102 can receive the priority information 132 that specifies an order in which failures of the checks 116 are to be addressed. For example, the computer device 102 may receive the priority information 132 from a publisher according to the subscription 138.

Performing, in step 1130, the plurality of automated diagnostic procedures. For example, the checks 116 can be performed in the computer device 102.

Upon at least some of the automated diagnostic procedures failing, performing, in step 1140, a plurality of automated remedy procedures in the specified order. The automated remedy procedures are associated with the failed automated diagnostic procedures. For example, upon at least some of the checks 116 failing, the fixes 118 can be performed in the specified order, the fixes 118 being associated with the failed checks 116.

Users frequently add customized components to a system including preconfigured components obtained from a software manufacturer. However, if the diagnosis tool 114 is used in such a system, the checks 116 may not be adequate for detecting every problem that may occur due to the customized components. The user who is familiar with the customized component(s) is typically in a good position to determine what kinds of problems may be caused and what measures should be taken to overcome them. A user may therefore with to add user defined checks to the checks 116 to address problems that may be caused by particular characteristics of the user's system. For similar reasons, the user may wish to formulate user defined fixes to be associated with such checks, so that the problems that the user can foresee occurring in the system can be diagnosed and properly addressed.

Figure 12:
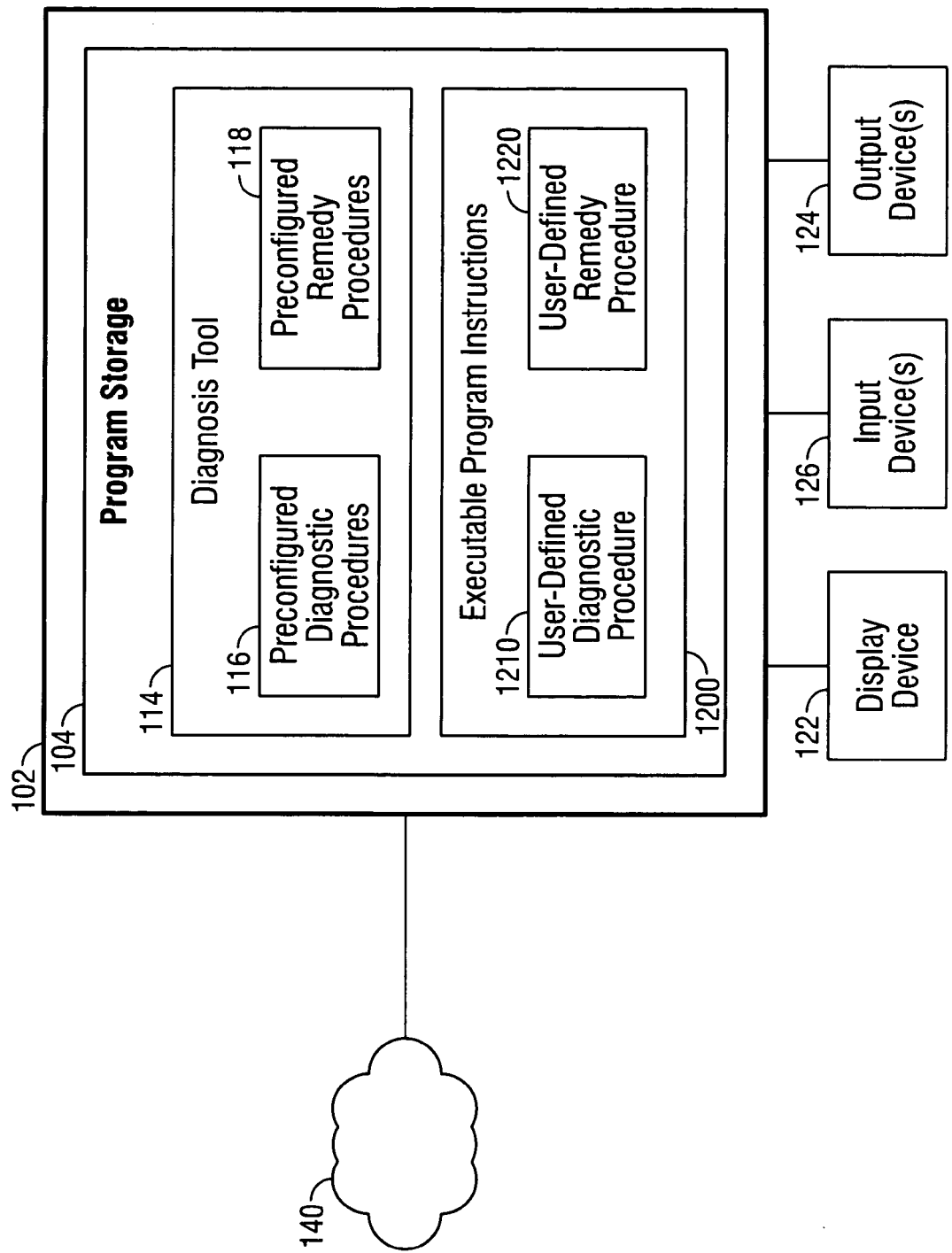
FIG. 12 is a block diagram of part of the system shown in FIG. 1.

FIG. 12 shows that the computer device 102 may be capable of receiving such user defined checks and fixes. For clarity, only part of system 100 is shown in FIG. 12, and it is noted that any of the FIG. 1 components may be included and operate as described above.

The program storage 104 is provided with the diagnosis tool 114 which may include the checks 116 and fixes 118 as described above. FIG. 12 labels these components "Preconfigured diagnostic Procedures 116" and "Preconfigured Remedy Procedures 118", respectively, to distinguish them from those that are defined by the user. Here, the procedures 116 will be referred to as "preconfigured checks 116" and the procedures 118 as "preconfigured fixes 118" for brevity.

The computer device 102 has been further provided with executable program instructions 1200 to implement one or more user defined procedures. The diagnosis tool 114 is adapted to perform the preconfigured checks 116 and preconfigured fixes 118, substantially as described above. The diagnosis tool 114 also is configured to accept user developed procedures. The executable program instructions 1200 may include at least one user defined diagnostic procedure 1210 and at least one user defined remedy procedure 1220 associated with the procedure 1210. These components will be referred to as user defined check 1210 and user defined fix 1220, respectively. For example, the user formulates the user defined check 1210 to probe for a particular problem that the user foresees may occur in the computer device 102. This may be a problem for which the diagnosis tool 114 does not have a suitable check. Similarly, the user may formulate the user defined fix 1220 to perform one or more steps that are believed to resolve the problem that can be identified by check 1210.

When the diagnosis tool 114 is executed in the computer device 102, the preconfigured checks 116 as well as the user defined check 1210 are performed. If any of the checks 116 or 1210 fail, the user can initiate fixes associated with the failed checks, for example as described in earlier examples above. The user can provide the computer device 102 with the instructions 1200 through input devices 126 or by using the computer device 102 to retrieve the instructions 1200 from a remote storage location through network 140.

In some implementations, the instructions 1200 are provided in form of a plug-in to the diagnosis tool 114. That is, the diagnosis tool 114 may be adapted to receive one or more plug-in software components that provide checks and fixes executable within the framework of the tool 114. Particularly, the preconfigured checks 116 and preconfigured fixes 118 may be provided as plug-in components when the diagnosis tool 114 is delivered, and the tool 114 is capable of accepting one or more user defined checks and fixes as additional plug-in components.

One example of a plug-in technology that can be used with embodiments of the invention is the so-called business add-in (BAdI) feature used in products available from SAP AG in Walldorf, Germany. Particularly, the diagnosis tool 114 may be provided with a BAdI definition that can be used for creating BAdI implementations of user defined checks and fixes. Essentially, a user may design the required procedure steps that are to be performed by the user defined check and fix, and enter them into customizing tables for the tool 114. The customizing tables are capable of receiving these steps as part of creating user defined BAdIs. SAP provides an enhancement tool for creating BAdI implementations, and the implementation may be created based on the predelivered BAdI definition for the diagnosis tool 114. Additional user input also may be required, such as implementing the required codes for generated programming objects relating to the user defined BAdI, creating documents that include instructions for guided procedure steps, and creating GUI screens to be used when the fix is being performed. Thus, one or more user defined checks 1210 and fixes 1220 can be provided as BAdI implementations to the diagnosis tool 114.

Figure 13:
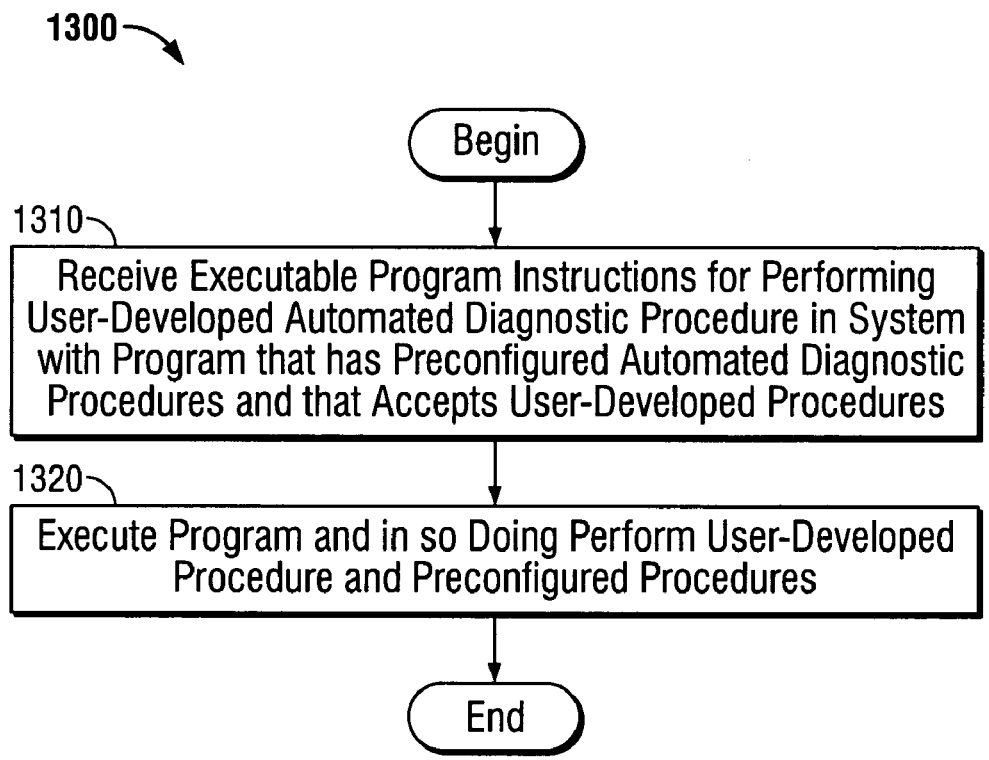
FIG. 13 is a flow chart of a method of performing diagnosis in a computer system.

FIG. 13 is a flow chart of a method 1300 of performing diagnosis in a computer system. Preferably, the method 1300 is performed in the system 100. For example, a computer program product can include instructions that cause a processor to perform the steps of method 1300. The following steps are included in method 1300:

Receiving, in step 1310, executable program instructions that, when executed, cause the computer system to perform a first user developed automated diagnostic procedure. The user developed procedure either fails or passes depending on at least one condition in the computer system. The computer system has stored therein a program 1) that when executed, performs a plurality of preconfigured automated diagnostic procedures and 2) that is configured to accept user developed automated diagnostic procedures. For example, the computer device 102 can receive the executable program instructions 1200. The instructions 1200 can cause the computer device 102 to perform the user defined check 1210. The computer device 102 may have stored therein the diagnosis tool 114 that 1) performs the preconfigured checks 116 and 2) is configured to accept the user defined check 1210.

Executing, in step 1320, the program in the computer system and in so doing performing the plurality of preconfigured automated diagnostic procedures and the first user developed automated diagnostic procedure. For example, the diagnosis tool 114 can be executed in the computer device 102. In so doing, the preconfigured checks 116 and the user defined check 1210 can be performed.

It will be clear from the above description that many different kinds of testing can be performed using embodiments of the present invention. The following are examples of some application-based checks that can be implemented:

A. HTTP check. A check for determining whether a Hypertext-Transfer Protocol (HTTP) server is defined in a system. Such a server may be used for searching and compilation in a CRM system. An additional check may be implemented to determine, when such a server is defined, whether the connections defined for the server can be established.

B. Java configuration check. In a system where a Java-server interacts with a non-Java server, such as a CRM server, a check can be implemented that determines a configuration on the Java side. For example, the check can determine whether a remote call function (RFC) destination is configured to a correct CRM system.

C. Default configuration check. A check for determining consistency between current configuration(s) and default configuration(s).

D. Search engine check. A check that determines whether a property file of a search engine is correctly deployed.

E. Java version check. A check that determines whether versions of deployed Java components are consistent.

F. Round-trip loading check. In a system where a Java-server interacts with a non-Java server, such as a CRM server, a check can be implemented that determines round-trip loading of configurations between the servers.

G. Auto-suggest round trip check. A check that verifies proper operation of an auto-suggest round trip between a server and a search engine. For example, the check may send simulated text input from the engine to the server.

The following are examples of some content-based checks that can be implemented:

H. Search engine status check. A check that determines status of a search engine. For example, the check can determine whether the engine is working.

I. Knowledge retrieval check. A check that verifies knowledge retrieval from a knowledge repository.

J. Index existence check. A check that determines whether an index has been created in a search engine.

K. Index content verification check. A check that verifies validity of an index in a search engine. For example, the check can provide an index content dump.

L. Index maintenance cycle check. A check that verifies a maintenance cycle of a search engine index. For example, the check can verify creation, compilation, searching and deletion of the index.

Figure 14:
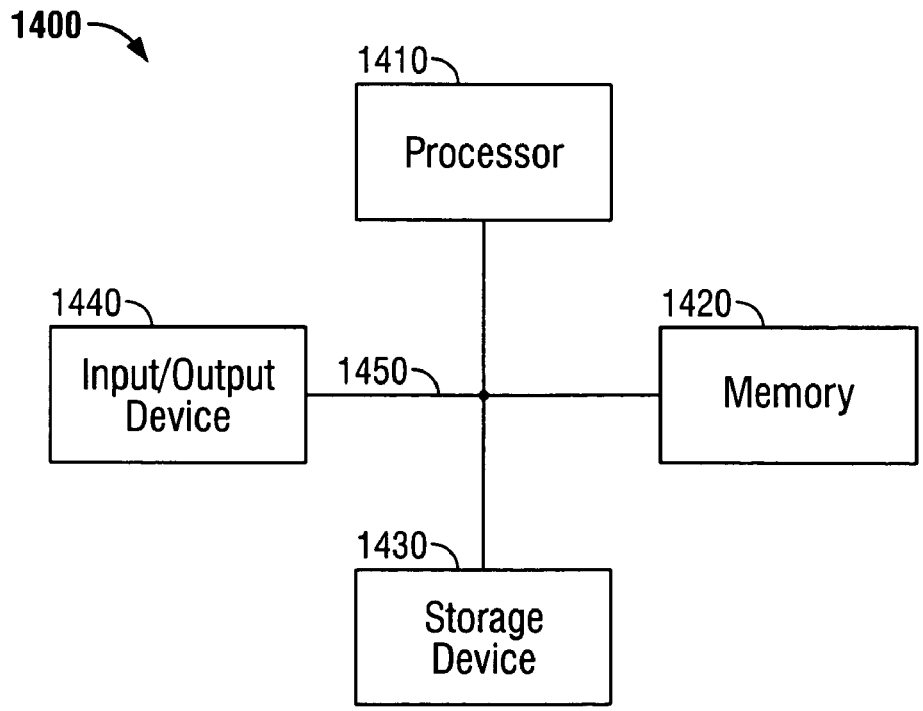
FIG. 14 is a block diagram of an exemplary computer system.

FIG. 14 is a block diagram of a computer system 1400 that can be used in the operations described above, according to one embodiment. The system 1400 includes a processor 1410, a memory 1420, a storage device 1430 and an input/output device 1440. Each of the components 1410, 1420, 1430 and 1440 are interconnected using a system bus 1450. The processor 1410 is capable of processing instructions for execution within the system 1400. In one embodiment, the processor 1410 is a single-threaded processor. In another embodiment, the processor 1410 is a multi-threaded processor. The processor 1410 is capable of processing instructions stored in the memory 1420 or on the storage device 1430 to display graphical information for a user interface on the input/output device 1440.

The memory 1420 stores information within the system 1400. In one embodiment, the memory 1420 is a computer-readable medium. In one embodiment, the memory 1420 is a volatile memory unit. In another embodiment, the memory 1420 is a non-volatile memory unit.

The storage device 1430 is capable of providing mass storage for the system 1400. In one embodiment, the storage device 1430 is a computer-readable medium. In various different embodiments, the storage device 1430 may be a floppy disk device, a hard disk device, an optical disk device, or a tape device.

The input/output device 1440 provides input/output operations for the system 1400. In one embodiment, the input/output device 1440 includes a keyboard and/or pointing device. In one embodiment, the input/output device 1440 includes a display unit for displaying graphical user interfaces as discussed above with reference to FIGS. 2, 3A-B, 4A-D, 8A-B and 10A-B.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of performing diagnosis in a computer system, the method comprising:

receiving in a computer system executable program instructions that, when executed, cause the computer system to perform a first user-developed automated diagnostic procedure that either fails or passes depending on at least one condition in the computer system, the computer system having stored therein a program 1) that, when executed, performs a plurality of preconfigured automated diagnostic procedures and 2) that is configured to accept user-developed automated diagnostic procedures;

receiving priority information specifying an order in which the plurality of preconfigured automated diagnostic procedures is to be performed in the computer system, the priority information reflecting dependencies between the automated diagnostic procedures;

receiving user input to modify the priority information to specify where in relation to the specified order to perform the first user-developed automated diagnostic procedure; and executing the program in the computer system after receiving the executable program instructions and the user input and in so doing performing the plurality of preconfigured automated diagnostic procedures and the first user-developed automated diagnostic procedure according to the modified priority information.

2. The method of claim 1, wherein the user-developed automated diagnostic procedure comprises at least one selected from the group consisting of: an application based automated diagnostic procedure and a content based automated diagnostic procedure.

3. The method of claim 1, wherein the user-developed automated diagnostic procedure is a Business Add-In component.

4. The method of claim 3, wherein the plurality of preconfigured automated diagnostic procedures are Business Add-In components.

5. The method of claim 1, wherein the plurality of preconfigured automated diagnostic procedures comprises at least one installation automated diagnostic procedure.

6. The method of claim 1, wherein a failure of the user-developed automated diagnostic procedure comprises one selected from the group consisting of: an informational message, an advisory, a warning, a fatal error notification, and combinations thereof.

7. The method of claim 1, wherein the executable program instructions, when executed, further cause the computer system to perform a user-developed automated remedy procedure that is associated with the user-developed automated diagnostic procedure.

8. The method of claim 7, wherein the user-developed automated remedy procedure comprises a troubleshooting procedure designed to identify a problem source that may cause the user-developed automated diagnostic procedure to fail.

9. The method of claim 7, wherein the user-developed automated remedy procedure is designed to remedy a problem that may cause the user-developed automated diagnostic procedure to fail.

10. The method of claim 1, wherein the priority information comprises a matrix with dependency values for the automated diagnostic procedures and wherein one of the dependency values indicates a correlation probability between two of the automated diagnostic procedures, further comprising:
deciding a relative order of the two automated diagnostic procedures based on the correlation probability if the correlation probability is at least a threshold value.

11. The method of claim 10, further comprising receiving another user input doing at least one selected from the group consisting of: specifying a correlation probability between two of the automated diagnostic procedures, selecting a correlation probability between two of the automated diagnostic procedures not to be updated, modifying the specified order, and combinations thereof.

12. The method of claim 10, further comprising updating the priority information if more than one of the plurality of automated diagnostic procedures fail.

13. The method of claim 12, further comprising publishing the updated priority information.

14. A computer program product tangibly embodied in a machine-readable storage device, the computer program product including instructions that, when executed, cause a processor to perform operations including:
receive in a computer system executable program instructions that, when executed, cause the computer system to perform a first user-developed automated diagnostic procedure that either fails or passes depending on at least one condition in the computer system, the computer system having stored therein a program 1) that, when executed, performs a plurality of preconfigured automated diagnostic procedures and 2) that is configured to accept user-developed automated diagnostic procedures;
receive priority information specifying an order in which the plurality of preconfigured automated diagnostic procedures is to be performed in the computer system, the priority information reflecting dependencies between the automated diagnostic procedures;
receive user input to modify the priority information to specify where in relation to the specified order to perform the first user-developed automated diagnostic procedure: and
execute the program in the computer system after receiving the executable program instructions and the user input and in so doing performing the plurality of preconfigured automated diagnostic procedures and the first user-developed automated diagnostic procedure according to the modified priority information.

15. The computer program product of claim 14, wherein the user-developed automated diagnostic procedure is a Business Add-In component.

16. The computer program product of claim 14, wherein the executable program instructions in the computer system, when executed, further cause the computer system to perform a user-developed automated remedy procedure that is associated with the user-developed automated diagnostic procedure.

17. The computer program product of claim 16, wherein the user-developed automated remedy procedure comprises a troubleshooting procedure designed to identify a problem source that may cause the user-developed automated diagnostic procedure to fail.

18. The computer program product of claim 16, wherein the user-developed automated remedy procedure is designed to remedy a problem that may cause the user-developed automated diagnostic procedure to fail.

19. The computer program product of claim 14, wherein the priority information comprises a matrix with dependency values for the automated diagnostic procedures and wherein one of the dependency values indicates a correlation probability between two of the automated diagnostic procedures, and wherein the operations further comprise: decide a relative order of the two automated diagnostic procedures based on the correlation probability if the correlation probability is at least a threshold value.

20. The computer program product of claim 19, wherein the operations further comprise: update the priority information if more than one of the plurality of preconfigured automated diagnostic procedures fail.

21. The computer program product of claim 19, wherein the operations further comprise: receive another user input doing at least one selected from the group consisting of: specifying a correlation probability between two of the automated diagnostic procedures, selecting a correlation probability between two of the automated diagnostic procedures not to be updated, modifying the specified order, and combinations thereof.

* * * * *